Jan. 30, 1923.

C. R. EDWARDS.
PIPE PULLER.
FILED JAN. 17, 1921.

1,443,463.

2 SHEETS—SHEET 1.

Inventor
Charles R. Edwards
By
Hardway Cathey
Attorneys

Patented Jan. 30, 1923.

1,443,463

UNITED STATES PATENT OFFICE.

CHARLES R. EDWARDS, OF HOUSTON, TEXAS.

PIPE PULLER.

Application filed January 17, 1921. Serial No. 437,969.

*To all whom it may concern:*

Be it known that I, CHARLES R. EDWARDS, a citizen of the United States, residing at Houston, in the county of Harris and State of Texas, have invented certain new and useful Improvements in a Pipe Puller, of which the following is a specification.

This invention relates to new and useful improvements in a pipe pulling device.

One object of the invention is to provide a pipe puller which may be readily let down into a well bore and engaged with the pipe therein to be pulled and which may be readily released from the pipe in case the pipe cannot be withdrawn or when it is for any reason desirable to release the same.

Another object of the invention is to provide a device of the character described which is simple in construction and operation and which can consequently be cheaply manufactured.

With the above and other objects in view the invention has particular relation to certain novel features of construction, operation and arrangement of parts, an example of which is given in this specification and illustrated in the accompanying drawings, wherein:—

Figure 1:
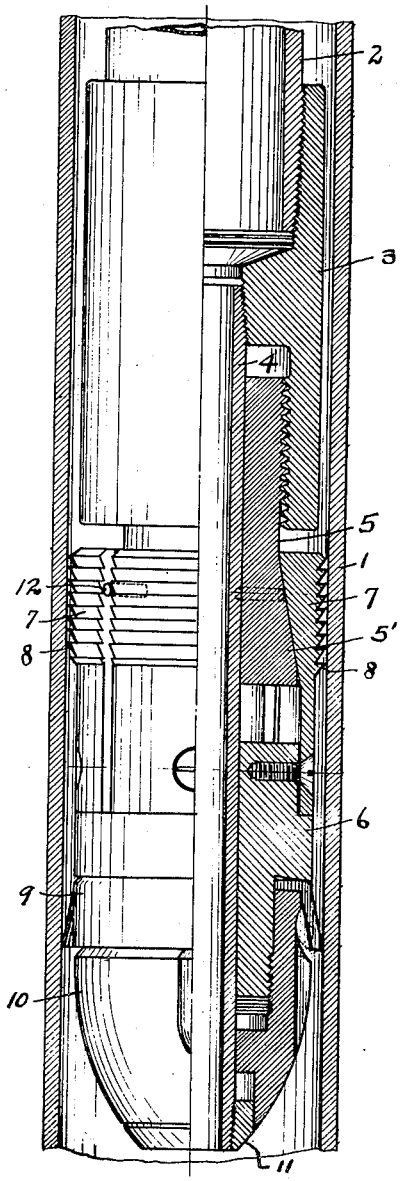
Figure 2:
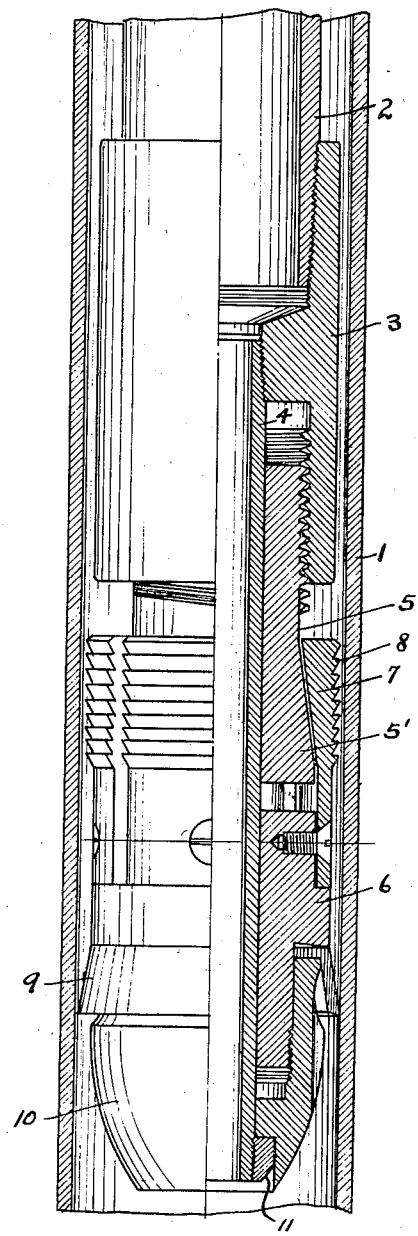

Figure 1 is a vertical sectional view of the device, shown in engagement with the pipe to be pulled, and Figure 2 is a vertical sectional view of the device, shown in released position.

Referring now more particularly to the drawings, wherein like numerals of reference designate similar parts in each of the figures, the numeral 1 refers to the pipe to be pulled and the numeral 2 designates the tubing to the lower end of which the device, hereinafter described, is attached. Threaded onto the lower end of said tubing there is a nipple 3. This nipple supports the stem 4 whose upper end is threaded therein. The lower end of the nipple 3 is spaced from said stem and has coarse internal threads. Fitted onto the stem there is an expanding sleeve 5 whose upper end is threaded into the lower end of said nipple, and the lower end 5' of said sleeve is flared. Underneath said expanding sleeve and spaced therefrom there is an annular anchor 6 which surrounds the sleeve 4 and anchored to the upper end of said anchor are the pipe engaging jaws 7. These jaws have a certain amount of flexibility and have their upper ends somewhat thickened. The outer face of the thickened portion is serrated forming pipe engaging teeth 8, and the inner sides sloping to fit closely against the flared lower end 5' of the expanding sleeve 5. The anchor 6 has a cup ring 9 clamped thereon by means of the elongated downwardly tapering clamp nut 10 which is threaded onto said anchor, and this clamp nut is locked against detachment by means of the lock nut 11 which is threaded onto the lower end of the stem. The lock nut 11 is spaced relative to the clamp nut 10 so as to permit a limited vertical movement of the anchor 6 relative to the stem.

When it is desired to pull a pipe from a bore the device is let down into the bore by means of the tubing 2 and enters the pipe to be pulled. The tubing 2 is then suddenly pulled upwardly by means of any well known form of apparatus for this purpose. The inertia of the anchor 6 will cause the expanding sleeve 5 to move upwardly relative to the jaws 7 and this will expand said jaws into engagement with the pipe and a further upward pull will usually result in the withdrawal of the pipe from the bore. In case the pipe is stuck in the bore and cannot be dislodged it is necessary to release the device and withdraw it from the bore. In order to release it the tubing 2 is turned to the right, causing a similar turning of the nipple 3 in the stem 4. The expanding sleeve 5, however, is held against turning by means of the pins 12 which are threaded into said sleeve and whose outer ends project out between the jaws 7. It is to be here noted that the threads connecting the nipple 3 and the expanding sleeve 5 are left-hand threads and as the tubing is turned, as above stated, the expanding sleeve 5 will be unscrewed and forced downwardly into the position shown in Figure 2, thus releasing the jaws 7 from the pipe and the device may then be withdrawn from the bore, It is to be noted that during the operation of pulling the pipe, water may be forced under pressure down through the tubing 2 and the stem 4, and the pressure of the fluid will cause the cup ring 9 to expand and prevent the return of the water up on the outside of it, thus materially assisting in loosening the pipe in the bore preparatory to the withdrawal from the bore.

What I claim is:—

1. A pipe puller, including a stem, an anchor slidably mounted on the stem, pipe engaging jaws attached to the anchor and normally engaging the pipe, and means attached to the stem by a single threaded part through the rotation of which said jaws may be released from said pipe.

2. A pipe puller, including a stem, an anchor slidably mounted on the stem, pipe engaging jaws attached to said anchor and normally out of engagement with the pipe to be pulled, means movable on the stem and adapted to expand said jaws into engagement with the pipe and a device carried by the stem, and connected to the expanding means by a threaded connection, for actuating said expanding means.

3. A pipe puller, including a stem, an anchor slidably mounted thereon, pipe engaging jaws attached to said anchor, an expanding sleeve slidably mounted on the stem and against which said jaws bear whereby they are held in engagement with the pipe, and means sustaining the stem and threaded onto the sleeve through which said sleeve may be actuated to release said jaws.

4. A pipe puller, including a stem, an anchor slidably mounted thereon, pipe engaging jaws attached to the anchor, an expanding member against which the jaws bear whereby they are normally held in position to engage with the pipe to be pulled, and a nipple sustaining the stem and threaded onto said member through which said member may be actuated into position to effect the engagement of said jaws with, or to release the jaws from the pipe.

5. A pipe puller, including a stem, an anchor slidable thereon, pipe engaging jaws attached to the anchor and normally out of engagement with the pipe to be pulled, an expanding member on the stem against which the jaws work and whereby said jaws are expanded into engagement with the pipe, and a nipple to which the stem is attached, said nipple being connected to said member by a single thread, and when rotated, actuating the same to release the jaws.

6. A pipe puller, including a stem, an anchor slidable thereon, pipe engaging jaws attached to the anchor, a flared sleeve on the stem against the periphery of which the jaws rest, a nipple threaded onto said sleeve and to which the stem is attached, means for rotating said nipple to actuate the sleeve lengthwise on the stem.

7. A pipe puller, including a stem, an anchor slidable thereon, pipe engaging jaws attached to the anchor, a flared sleeve on the stem against the periphery of which the jaws rest, a nipple threaded onto said sleeve and to which the stem is attached, means for rotating said nipple to actuate the sleeve lengthwise on the stem, and means for preventing the rotation of the sleeve relative to said jaws.

8. A pipe puller including a tubular stem, pipe engaging means slidably mounted relative to the stem, an expanding member adapted, when in one position to expand said means into engagment with the pipe said expanding means being attached to the stem by a single-threaded part through the rotation of which said pipe engaging means may be released from the pipe.

9. A pipe puller including a tubular stem, pipe engaging means slidably mounted on the stem, a member adapted to actuate said engaging means into engagement with the pipe to be pulled and means attached to the stem and connected to said actuating means by a single-threaded part, through the rotation of which said pipe engaging means may be released from the pipe.

10. A pipe puller including a stem, an anchor slidably mounted on the stem, pipe engaging jaws attached to the anchor, means attached to the stem through the rotation of which said jaws may be permitted to contract to release them from the pipe, said stem having a water course leading downwardly through it to admit water through the pipe puller into the pipe beneath it.

11. A pipe puller including a stem, an anchor slidably mounted on the stem, pipe engaging jaws attached to the anchor, means attached to the stem through the rotation of which said jaws may be permitted to contract to release them from the pipe, said stem having a water course leading downwardly through it to admit water through the pipe puller into the pipe beneath it, and a cup ring surrounding the device and fitting within the pipe to be pulled to prevent the return of the water around the device.

12. A pipe puller including a tubular stem, an anchor slidably mounted on the stem, pipe engaging jaws attached to the anchor and normally engaging the pipe, an expanding sleeve whose lower end is flared and bears against the inner side of said jaws, said expanding sleeve having a threaded connection with an operating tube through which it may be manipulated.

13. A pipe puller including an anchor, pipe engaging members carried thereby, means through which said members may be engaged with and released from a pipe into which the device is adapted to be inserted, said device being provided with a water course extending downwardly therethrough.

In testimony whereof I have signed my name to this specification in the presence of two subscribing witnesses.

CHARLES R. EDWARDS.

Witnesses:
R. M. SMITH,
WM. A. CATHEY.